United States Patent
Goldentouch et al.

(10) Patent No.: US 10,349,040 B2
(45) Date of Patent: Jul. 9, 2019

(54) STORING DATA RETRIEVED FROM DIFFERENT SENSORS FOR GENERATING A 3-D IMAGE

(71) Applicant: INUITIVE LTD., Ra'anana (IL)

(72) Inventors: Lev Goldentouch, Rishon Lezion (IL); Genadiy Vasserman, Petac Tikva (IL)

(73) Assignee: INUITIVE LTD., Ra'anana (IL)

( * ) Notice: Subject to any disclaimer, the term of this patent is extended or adjusted under 35 U.S.C. 154(b) by 0 days.

(21) Appl. No.: 15/761,555

(22) PCT Filed: Sep. 11, 2016

(86) PCT No.: PCT/IL2016/051014
§ 371 (c)(1),
(2) Date: Mar. 20, 2018

(87) PCT Pub. No.: WO2017/051407
PCT Pub. Date: Mar. 30, 2017

(65) Prior Publication Data
US 2018/0262749 A1    Sep. 13, 2018

Related U.S. Application Data

(60) Provisional application No. 62/221,144, filed on Sep. 21, 2015.

(51) Int. Cl.
  *H04N 13/00* (2018.01)
  *H04N 13/271* (2018.01)
  *G06T 7/80* (2017.01)
  *H04N 13/246* (2018.01)
  *H04N 13/239* (2018.01)

(52) U.S. Cl.
  CPC ............. *H04N 13/271* (2018.05); *G06T 7/85* (2017.01); *H04N 13/239* (2018.05);
  (Continued)

(58) Field of Classification Search
  CPC .. H04N 13/271; H04N 13/246; H04N 13/239; H04N 13/00; H04N 13/243;
  (Continued)

(56) References Cited

U.S. PATENT DOCUMENTS 6,985,162 B1    1/2006  Schinnerer et al.
8,897,596 B1 *  11/2014 Passmore ........... H04N 13/0267
                                          382/154
(Continued)

FOREIGN PATENT DOCUMENTS

WO    2013109252 A1    7/2013
WO    2014154839 A1    10/2014

OTHER PUBLICATIONS

Devy, M. et al., "Stereovision Algorithm to be Executed at 100Hz on a FPGA-Based Architecture. in Advances in Theory and Applications of Stereo Vision", XP055330884, Retrieved from the Internet URL:<http://cdn.intechopen.com/pdfs/12980/InTech-stereovision_algoritlun_to_be_executed_at_100hz_on_a_fpga_based_architecture.pdf> (Jan. 8, 2011).

(Continued)

*Primary Examiner* — Sherrie Hsia
(74) *Attorney, Agent, or Firm* — Browdy and Neimark, PLLC

(57) ABSTRACT

A method is provided for use in a stereoscopic image generating system comprising two cameras, a plurality of memory buffers, and at least one processor. The method comprises: identifying at least one common region of interest (ROI) at images obtained from the two cameras; generating a Look Up table (LUT), for holding displacement values of pixels that belong to the at least one common ROI; forwarding data associated with images obtained from the two cameras that relates to the at least one common ROI, to the plurality of memory buffers; processing output lines retrieved from the plurality of memory buffers and propa- (Continued)

gating data that relates to a YUV image and associated LUTs, wherein the propagating of the data is carried out at a rate associated with a respective memory buffer from which that data is retrieved; and generating a stereoscopic image based on the propagated data.

10 Claims, 4 Drawing Sheets

(52) U.S. Cl.
CPC . *H04N 13/246* (2018.05); *G06T 2207/10012* (2013.01); *H04N 2013/0081* (2013.01)

(58) Field of Classification Search
CPC ... H04N 2013/0081; G06T 7/85; G06T 17/00; G06T 2207/10012; G06T 2207/10028; G06T 19/00
USPC ............... 348/42, 46–48, 51, 52; 382/154
See application file for complete search history.

(56) References Cited

U.S. PATENT DOCUMENTS

| | | | |
|---|---|---|---|
| 2005/0100207 A1 | 5/2005 | Konolige | |
| 2008/0309666 A1 | 12/2008 | Chen et al. | |
| 2009/0315976 A1 | 12/2009 | Jeong et al. | |
| 2010/0039502 A1 | 2/2010 | Robinson | |
| 2010/0142824 A1 | 6/2010 | Lu | |
| 2011/0169818 A1 | 7/2011 | Pan et al. | |
| 2011/0298898 A1 | 12/2011 | Jung et al. | |
| 2012/0014590 A1 | 1/2012 | Martinez-Bauza et al. | |
| 2012/0182397 A1* | 7/2012 | Heinzle | G06T 7/80 348/47 |
| 2013/0321592 A1 | 12/2013 | Kuno et al. | |
| 2014/0198977 A1 | 7/2014 | Narasimha et al. | |
| 2014/0267243 A1 | 9/2014 | Venkataraman et al. | |
| 2015/0023587 A1 | 1/2015 | Barone | |
| 2015/0049169 A1 | 2/2015 | Krig et al. | |
| 2015/0248769 A1 | 9/2015 | Ukil et al. | |
| 2018/0130220 A1* | 5/2018 | Goldentouch | G06T 1/0007 |

OTHER PUBLICATIONS

Joshi G.S. et al., "A Stereo Correspondence Cost Function for FPGAs.", International Journal of Emerging Technology and Advanced Engineering, vol. 3, No. 2, pp. 455-459, XP055330885, ISSN: 2250-2459, Retrieved from the Internet URL:<www.ijetae.com> (Feb. 28, 2013).

* cited by examiner

STORING DATA RETRIEVED FROM DIFFERENT SENSORS FOR GENERATING A 3-D IMAGE

TECHNICAL FIELD

The present disclosure generally relates to methods for using optical devices, and more particularly, to methods for generating a three-dimensional image of an object.

BACKGROUND

A stereoscopic camera arrangement is an element made of two camera units, assembled in a stereoscopic module. Stereoscopy (also referred to as "stereoscopics" or "3D imaging") is a technique for creating or enhancing the illusion of depth in an image by means of stereopsis. In other words, it is the impression of depth that is perceived when a scene is viewed with both eyes by someone with normal binocular vision which is responsible for creating two slightly different images of the scene in the two eyes due to the eyes '/camera's different locations.

Combining 3D information derived from stereoscopic images, and particularly for video streams, requires search and comparison of a large number of pixels that need to be held for each pair of images, where each image out of such a pair is derived from a different image capturing device.

This problem is further enhanced when depth needs to be determined from images derived from webcams, as in order to obtain the required three-dimensional image, the webcams output images should be rectified. During the rectification process, radial lens distortion and sensor rotation should be compensated based on preliminary sensor calibration results.

A hardware chip that is able to carry out such a rectification process, uses typically large memory buffers in order to correct for the displacement of each pixel received from each sensor. These buffers are typically sufficient for only a limited amount of distortion, and when using wide angle lenses for example, these lenses might introduce a higher degree of distortion than a single buffer of several lines can handle, while such a buffer is typically used to rectify the sensor outputs.

The number of lines to be processed corresponds to the maximal radial distortion and rotation that are supported by the system. For example, at 1920×960 pixels images and maximal distortion of 5% on two sensors, one would require the use of 960*0.05=48 lines of 1920 pixels, at 2 bytes per pixels, which amounts to about 3 Mbit of memory. While if three wide lens sensors are used with a maximum distortion of 20%, the resulting memory required of about 18 Mbit, would simply be prohibitive for carrying out such a process.

Thus, in order to provide an adequate answer to the increasing memory requirements, a new approach is proposed by the present invention, one which overcomes the problems discussed above.

SUMMARY OF THE DISCLOSURE

The disclosure may be summarized by referring to the appended claims.

It is an object of the present disclosure to provide a method for storing data retrieved from different image capturing sensors in a process of generating a three dimensional image.

It is another object of the present disclosure to provide a method for storing look up tables and improve subpixel accuracy, in order to rectify the three-dimensional image being generated.

It is still another object of the present disclosure to provide a method for storing data retrieved from different image capturing sensors in a plurality of memory buffers.

Other objects of the present invention will become apparent from the following description.

According to a first embodiment of the disclosure, there is provided a method for use in a stereoscopic image generating system comprising at least two image capturing sensors, a memory means comprising a plurality of memory buffers, and at least one processor, wherein the method comprises:

identifying at least one common region of interest (ROI) at images obtained from the at least two image capturing sensors;

generating at least one Look Up table (LUT), for holding displacement values of pixels that belong to the at least one common ROI;

forwarding data associated with images obtained from the at least two image capturing sensors that relates to the at least one common ROI, to the plurality of memory buffers;

processing output lines retrieved from the plurality of memory buffers and propagating data that relates to a YUV image and associated LUTs, wherein the propagating of the data is carried out at a rate associated with a respective memory buffer from which that data is retrieved; and generating a stereoscopic image based on the propagated data.

The method provided by the present disclosure includes a step of generating at least one Look Up table ("LUT"), which comprises values of displacement of the image pixels that belong to the at least one ROI. However, as will be appreciated by those skilled in the art, a LUT may include parameters of polynomials for splines and nominator/denominator polynomials, for more complex distortion computations.

The term "YUV" as used herein throughout the specification and claims, is used to denote a color space which is typically used as part of a color image pipeline.

The image capturing sensors referred to herein may refer to a camera and optionally at least one RGB sensor.

The term an "RGB sensor" is used herein throughout the specification and claims to denote a sensor (e.g. a camera) that is configured to deliver the three basic color components (red, green, and blue) on three different wires. This type of camera often uses three independent CCD sensors to acquire the three color signals. RGB cameras are typically used for very accurate color image acquisitions.

According to another embodiment, each of at least two of the plurality of memory buffers has a different height and/or a different width from that of another one of the at least two memory buffers.

In accordance with another embodiment, the data relating to the YUV image and the LUTs is propagated from one of the at least two memory buffers at a rate which is different from a rate at which that data is propagated from another of the at least two memory buffers.

By yet another embodiment, the method provided further including a step of compressing data comprised in at least one of the plurality of memory buffers.

According to still another embodiment, data comprised in one of the at least two memory buffers is compressed at a compression which is different from a compression applied to compress data at another of the at least two memory buffers.

According to another embodiment, the method provided further comprises a step of calculating an effective memory buffer height for each of the plurality of memory buffers.

In accordance with another embodiment, the method provided further comprises a step of calculating a vertical output rate for retrieving data from each of the plurality of memory buffers.

By still another embodiment, the data inserted in at least one of the plurality of memory buffers, at least partially overlaps data inserted in at least one other of the plurality of memory buffers.

In accordance with another embodiment, at least one of the memory buffers from among the plurality of memory buffers comprises a plurality of buffer segments. Optionally, the data propagated from one of the plurality of buffer segments, is propagated at a rate which is different from a rate at which data is propagated from at least one other of the plurality of segments per a video line.

It should be appreciated that different methods for creating these buffer segments may be implemented. For example, segments having width of 240 pixels and height of 12, 24 or 48 pixels may be considered as adequate candidates for this purpose. The resulting segments save on average 60% of the on-chip memory. Additional saving may be achieved by storing the data on the outmost buffers subsampled accordingly by maximal handled distortion, for example x1.5 on both axes.

Data may be retrieved from the segments at varying subpixel rate and acceleration, so that the narrowest segments travel more than the wider segments. The displacement grid may be interpolated within a subpixel accuracy.

Preferably, the data stored at the buffer segments is used for interpolating the displacement grid according to subpixel position of the segment. The subpixel displacement may be calculated by matching a displacement curve over the displacement grid. For example, for each displacement grid point, one may store not only the displacement along the X and Y axes, but also its first and second derivative, and then interpolate the displacement on a per pixel basis, accordingly.

BRIEF DESCRIPTION OF THE DRAWING

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

In addition, in the following description the term "reference sensor" should be understood as a sensor to which the disparity image is attributed, e.g., the right sensor or the left sensor. However, it should be understood by those skilled in the art, that a reference sensor may alternatively be a virtual reference sensor, generated by interpolating or extrapolating disparities that are visible by the left and right sensors, while filling in missing occlusion data.

Figure 1:
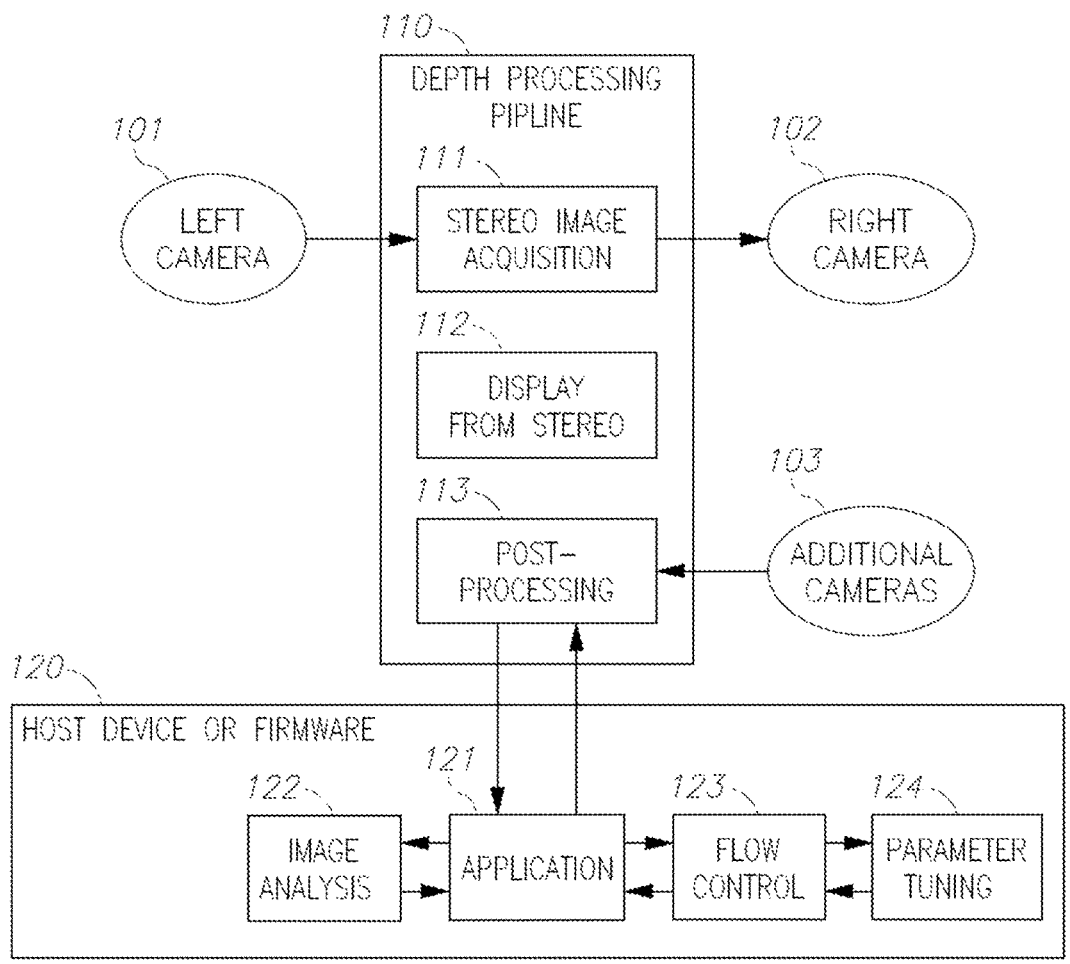
FIG. 1—illustrates an exemplary system construed according to an embodiment of the present invention.

FIG. 1 illustrates an exemplary system construed according to an embodiment of the present invention.

The system illustrated in this figure, comprises cameras 101 and 102 which are configured to capture essentially the same image but with some displacement caused by a baseline shift between the two cameras. A depth image may then be generated by combining the stereo images captured by these two cameras.

Optionally, an additional camera 103 (such as a webcam) may be used to provide an RGB image at a higher resolution. Such an RGB image should be combined with the depth image obtained by combining the two stereo images, in order to obtain a color image aligned with a 3D display.

Data is processed in order to determine the applicable depth from the stereo images by a processor (referred to herein as depth processing pipeline 110), which may be implemented by using a Very-large-Scale Integration ("VLSI") circuit or a Field-Programmable Gate Array ("FPGA"). It may generate disparity and/or depth related data as well as RGB data retrieved from the cameras' inputs. The depth processing pipeline is controlled by using registers and shadow registers set by the host device (or firmware) 120.

Stereo image acquisition block 111 may be implemented as a hardware pipeline performing any one or more of the following functions: sensor control, sensor synchronization, geometric distortion correction, illumination correction as well as other processing for generating a reliable 3D stereo image out of the data retrieved from cameras 101 and 102.

Disparity from stereo block 112 may be implemented by a hardware pipeline performing operations in order to generate disparity data from a stereo image as will be further described in connection with FIG. 2.

Post processing block 123 may be implemented as a hardware for improving the disparity image and generating depth related data output. In some embodiments it may further include RGB related data received from the camera(s).

Host device (or firmware) 120 is operative to control the depth processing pipeline 110 and to generate an output as may be required by the end user.

Application block 121 may execute various algorithms requested by the user, including face detection, skeleton tracking, hands tracking, gaze tracking, 3D object stitching, and the like.

Image analysis block 122 is operative to carry out one or more of the following functions: image segmentation, object detection and motion analysis.

Flow control block 123 is configured to carry out control of complex flows, using multiple heterogeneous frame acquisition.

Parameter tuning block 124 may be responsible for generating specific registers and shadow registers values, as well as for modifying software and firmware parameters for each consecutive frame.

Figure 2:
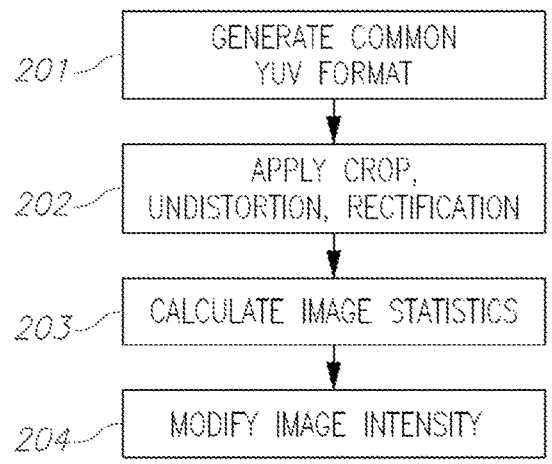
FIG. 2—exemplifies a block diagram of image acquisition module methods.

FIG. 2 exemplifies a flow chart of a process of implementing a method for image acquisition.

In step 201, various images provided in different image formats from cameras 101, 102 and 103 are processed and converted when necessary to a common YUV format, thereby encoding a color image or video frames while taking human perception into account, allowing reduced bandwidth for chrominance components. consequently, transmission errors and/or compression artifacts are more efficiently masked from the human perception than by simply using a "direct" RGB-representation.

Step 202 comprises applying any one or more of the following processes on the images after their conversion into their YUV format: crop, un-distortion, and/or rectification, as will be further described as the description proceeds.

Next, in step 203 image statistics are calculated. In some embodiments of the present invention, the image statistics may be used to control image exposure and camera analog gain. In addition or optionally, in other embodiments, the calculated image statistics may be used to crop the relevant part of the image, including dark or saturated areas, motionless areas, and the like.

In step 204, the image intensity is modified, including affecting any one or more of the following processes: white balance, histogram equalization, gamma correction, illumination uniformity correction and possibly any other applicable correction.

Figure 3:
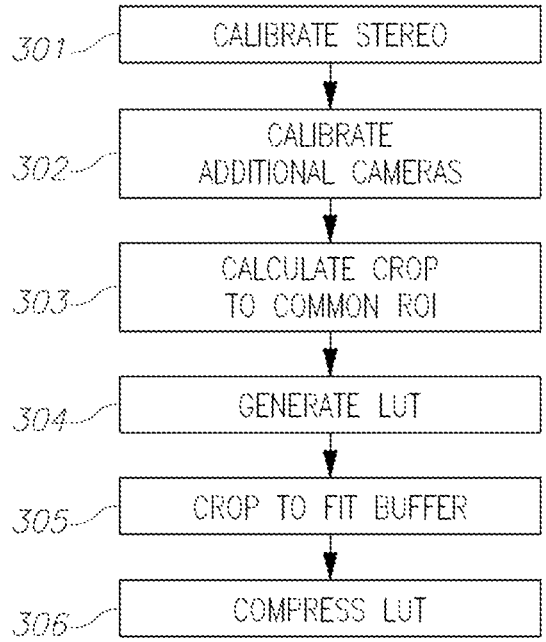
FIG. 3—illustrates a process of image cropping, undistortion, and LUT rectification according to an embodiment of the invention.

FIG. 3 exemplifies a process for preparing a LUT by applying an image acquisition module. A LUT ("Look Up Table") is a source for finding output color data corresponding to input color data. Using LUT enables reproducing the preferable color of the recorded images and generating the original look of the image, regardless of the output device used.

According to some embodiments of the present invention, some or all of the processes implemented under step 202 described above, namely image crop, undistortion and rectification, are performed by using complex LUTs (look-up-tables).

The steps comprised in this process are:

Calibrating stereo cameras 101 and 102 by using for example a checkerboard target, as described for example by OpenCV ("Open Source Computer Vision") or by Caltech image calibration code (step 301). During intrinsic stereo calibration, the distortion parameters of each camera are calculated, including radial and tangential distortion parameters. During extrinsic stereo calibration, the camera's mutual rotation and displacement is calculated. Corrections of intrinsic calibration parameters may be made by undistortion, whereas correction of extrinsic calibration parameters may be made by rectification.

In step 302, additional cameras are calibrated by using for example images taken during the stereo calibration step (step 301). The additional cameras calibration code may be very similar to the stereo calibration code applied in step 301 and may include similar intrinsic and extrinsic parameter calculation. The calculation of these intrinsic and extrinsic parameters may be further restricted by imposing a constrain whereby the calibration parameters calculated in step 301 are left unchanged (i.e. the calculation of the parameters in step 302 do not have a degree of freedom whereas the parameters calculated in step 301 may be changed).

In step 303, the crop to the common ROI ("region of interest") is calculated, so that cameras 101 and 102 and optionally also camera 103 may view a similar area. In some embodiments, image padding may also be applied.

Next, a LUT is generated (step 304), wherein the LUT includes calculations of displacement of the image pixels, that may be applied for undistorting and rectifying the image.

In step 305, a cropping mechanism is applied in order to fit the data to the available line buffer, thereby to enable carrying out un-distortion and rectification of the image. In some embodiments of the invention, the size of the line buffer that is available for carrying out un-distortion and rectification of the image, may be limited. Some cameras, for example, wide angle cameras may introduce radial distortion above the distortion that can be corrected by using the available line buffer. In some embodiments, the images may be cropped, so that the cropped images may be effectively undistorted and rectified by the available line buffer. In some embodiments the amount of required crop may be available a-priori based on known parameters of the camera's optics.

In step 306, the LUT is compressed for storage and processing (e.g. to obtain optimization) purposes. Such a compression may be done for example by down-sampling the LUT, and/or by encoding the difference (delta) between LUT elements. In some embodiments, the compression of the LUT may include polynomial computation for accurate subpixel evaluation of pixel displacement after having down-sampled the LUT.

Figure 4:
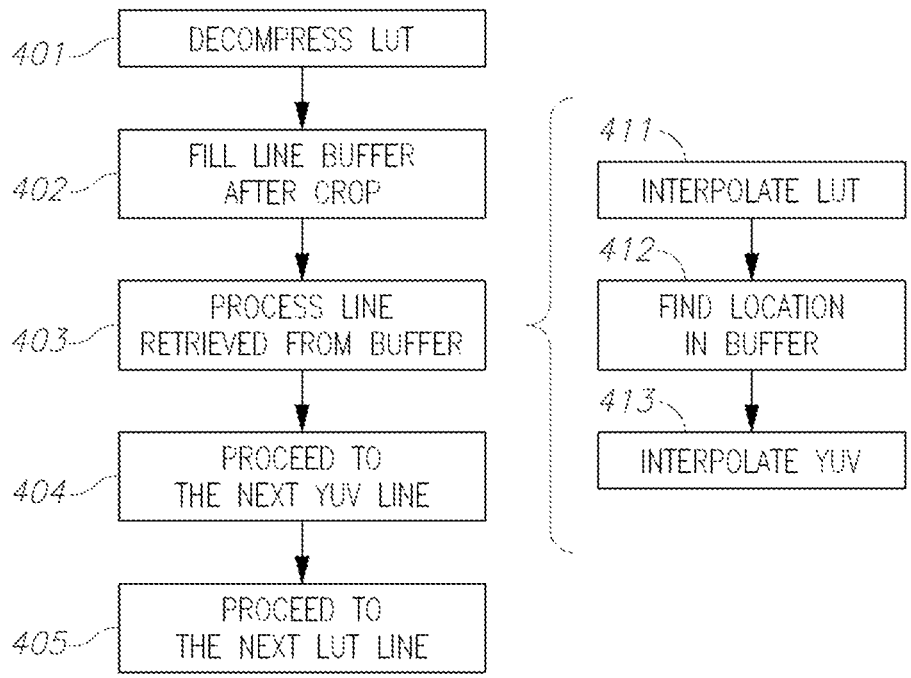
FIG. 4—exemplifies a single buffer image cropping, undistortion, rectification using LUT.

FIG. 4 demonstrates an example in which a LUT is applied by a single buffer imaging acquisition module.

In step 401 the LUT is decompressed to recover pixel displacement for the YUV line. In step 402 the YUV line buffer is filled if for instance, a cropping mechanism had already been applied onto the retrieved data.

The output YUV line is then processed (step 403) by using available line buffer memory. The processing may include the following operations: interpolating the data included in the LUT (step 411) in order to calculate displacement of a pixel by applying pixel displacements of LUT blocks. In some embodiments, the LUT polynomials are used for pixel displacement computation within the LUT blocks; finding location of the output pixel in YUV line buffer (step 412); interpolating YUV values from the line buffer (step 413) in order to calculate the YUV pixel value of the output pixel.

Now, after processing an output YUV line, data which relates to the next YUV line may be retrieved from YUV line buffer and from the output buffer (step 404). In some embodiments, the propagation rate of the input may be different from that of the output buffer due to radial distortion.

If required, the next LUT line is approached (step 405). The LUT may be subsampled with respect to YUV, and hence propagated at a different rate.

Figure 5:
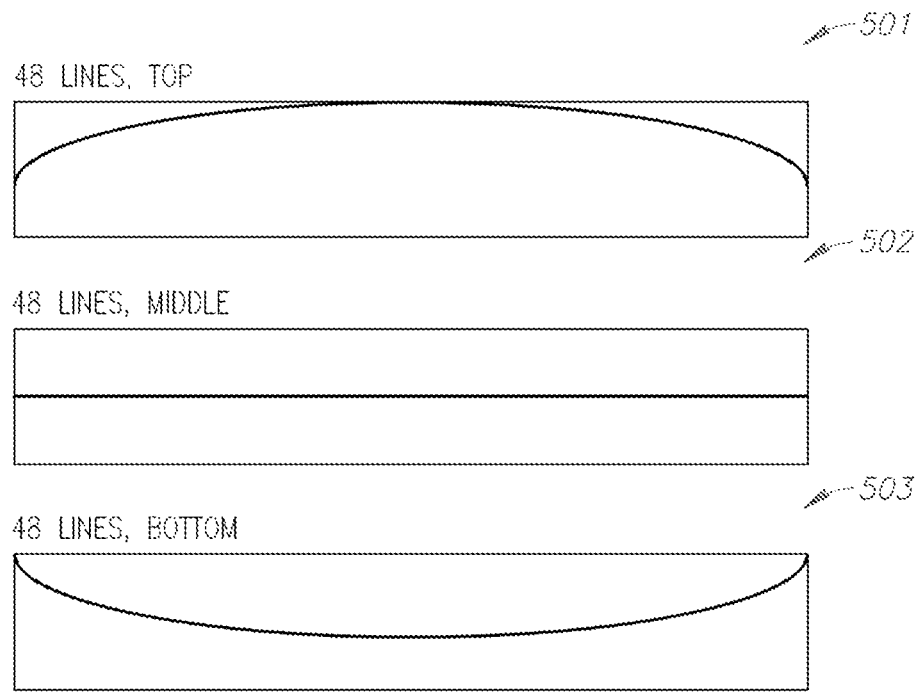
FIG. 5—illustrates a single buffer rectification.

FIG. 5 presents an example illustrating how may a pixel displacement within single line buffer, appear at various parts of the image.

At the top of the image (designated by 501), the radial distortion is substantial. In some cases, the YUV line buffer may need to be filled before an output pixel is extracted. In some cases, the displacement of the output pixel may point to different lines of the line buffer, for each column of the output image.

At the middle of the image (designated by 502), the radial distortion is relatively small, whereas at the bottom of the image (designated by 503), the radial distortion may mirror the radial distortion that exists at the top of the image (501).

Figure 6:
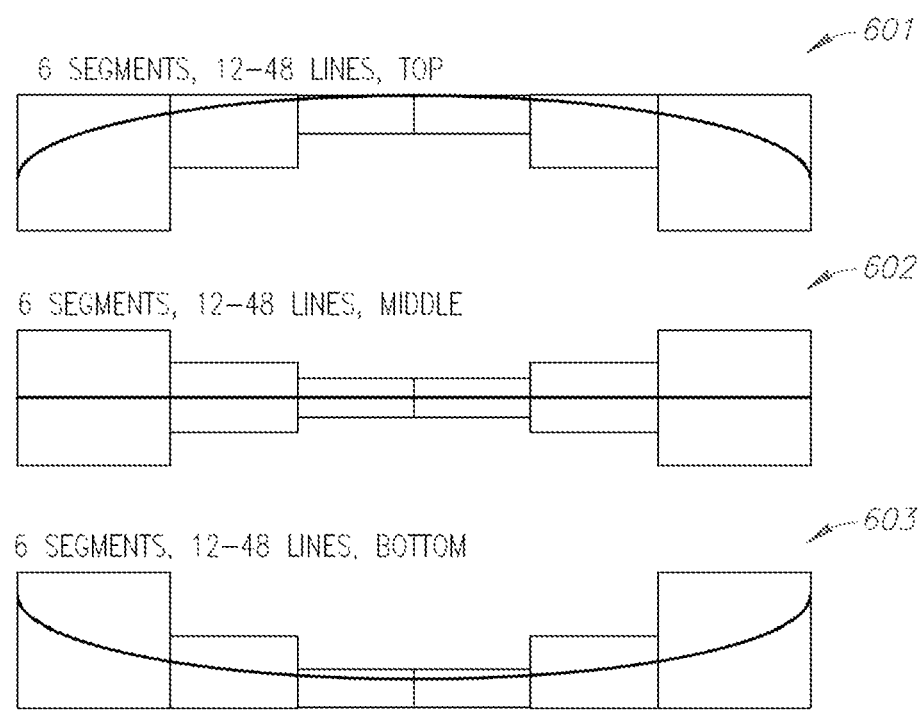
FIG. 6—represents a multiple buffer rectification process.

FIG. 6 presents an example in accordance with the present invention, illustrating how may a pixel displacement within multiple line buffers segments, appear at various parts of the image.

At the top of the image (designated by 601), the multiple line buffer segments are aligned with the top coordinate of the image. Each line buffer has its own horizontal size, vertical size and horizontal compression coefficients.

At the middle of the image (designated by 602), the radial distortion is relatively small. The multiple buffers are aligned, so that the output YUV is placed at the middle of each buffer.

At the bottom of the image (designated by 603), the multiple line buffers are aligned with the top coordinate of the image. Since each buffer may have a different vertical size, the buffers' data may be propagated at different rates. For example, data from narrow buffer may propagate faster than from a wide buffer.

Figure 7:
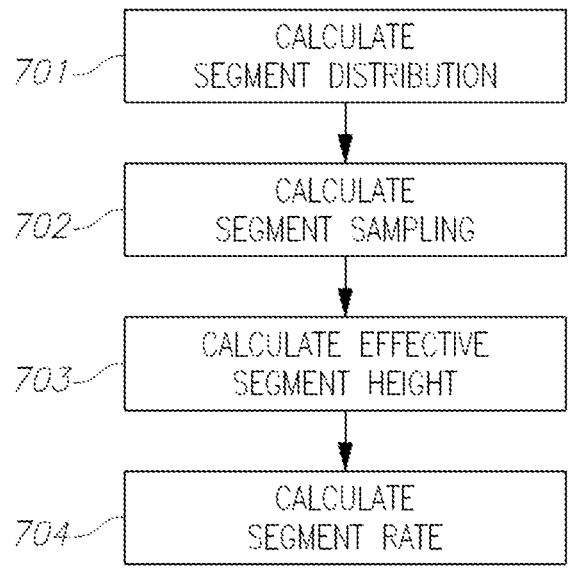
FIG. 7—exemplifies a method for generating a multi-LUT according to an embodiment of the invention.

FIG. 7 demonstrates a flow chart of an embodiment of the present invention of a method for calculating multiple segment LUTs.

Step 304 of FIG. 3 demonstrates generation of a LUT carried out by calculating displacement of the image pixels that may be applied for undistorting and rectifying the image. However, the LUT computation for a case of multiple buffers is typically a rather complex task, as illustrated in the embodiment presented in FIG. 7.

First, the segment distribution is calculated (step 701). As will be appreciated by those skilled in the art, line buffer memory blocks may be distributed unevenly between multiple line buffers, and the line buffers of each segment may have a different height and/or a different width. In certain cases, there may be constraints that affect the heights and/or widths of the memory segments allocated to the line buffers. The memory available for line buffers segments may be limited and the distribution of the memory between the various segments may involve carrying out a complex optimization under certain constraints, using for example a sub-gradient descent method.

Next, the segment compression is calculated (step 702). As a result of radial distortion, each segment may have a different sampling in the X direction with respect to the center of the segment. In some cases, a YUV output may also include several segments at which different compressions are applied.

In step 703, the effective segment height is calculated. In some embodiments of the present disclosure, only part of the buffer allocated to a segment may be used for un-distortion and rectification (typically due to hardware constraints). It may be required for example that a segment height is an integer which is a multiple of the number 4.

The vertical segment rate is then calculated (step 704) using an effective segment height calculated in step 703 and the YUV input height after carrying out the crop process.

Figure 8:
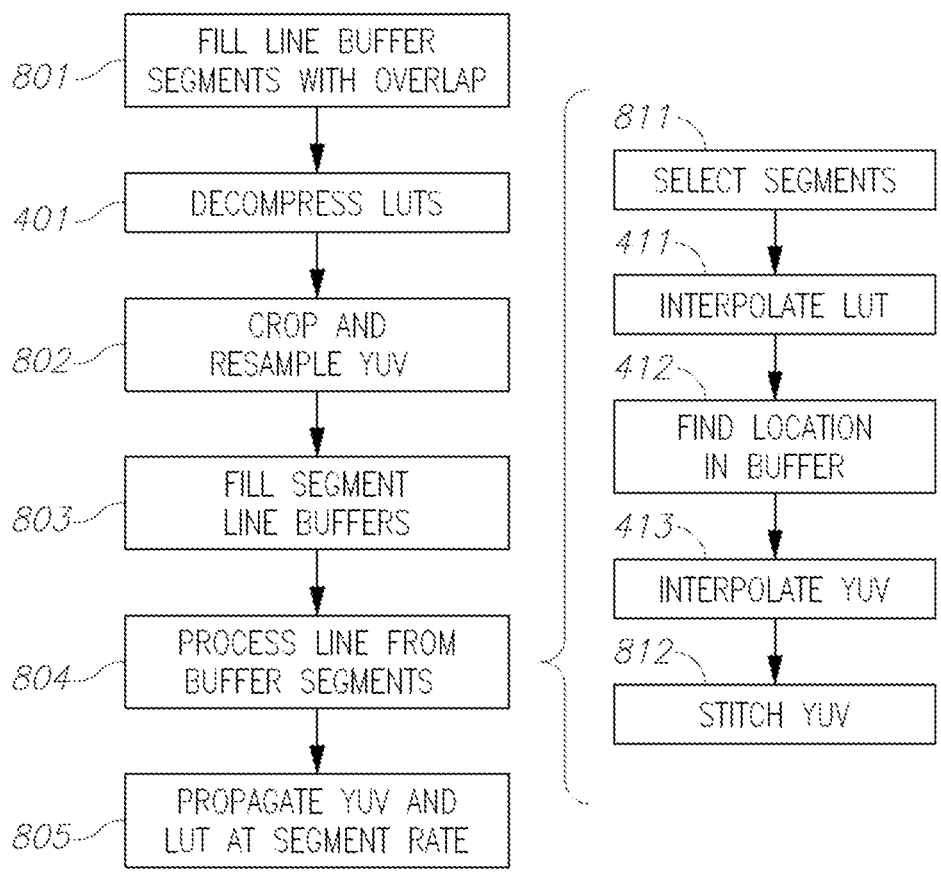
FIG. 8—illustrates a method for multi segment image cropping, undistortion, and rectification using LUT according to an embodiment of the invention.

FIG. 8 demonstrates an embodiment of a method for applying a LUT in case of a multi segment buffer used for an image acquisition module.

First, line buffer segments are filled while having a certain overlap there-between (step 801). The overlap between line buffers may facilitate horizontal interpolation to be calculated within each segment as well as stitching (combining) segments.

Next, LUTs are decompressed (as done in step 401 of FIG. 4). In some embodiments of the present disclosure, each segment may have a separate LUT associated therewith, in order to facilitate processing of the overlap mentioned in step 801.

In step 802, data related to the YUV image is cropped and resampled. According to an embodiment of the disclosure, the YUV image is horizontally resampled, since horizontal distortion is different for each line and the segment width may be constant.

Next, segment line buffers are filled (step 803), while bearing in mind that each segment's line buffer may have different characteristics that relate to its size and rate of outputting data therefrom.

The output lines received from the buffer segments are then processed (step 804), and data relating to the YUV image and the LUTs is propagated (step 805) at a rate that is associated with a respective by segment, since each segment is capable of propagating the data differently, for the output line propagation.

The output line from buffer segments is then processed (step 804), as demonstrated in the following example:

Selecting a number of segments (step 811), so that each pixel in each output line may be interpolated from an appropriate segment. Due to the application of horizontal resampling and cropping mechanisms, the segments' selection may change on a per line basis.

Carrying out an Interpolation of the LUT data within each of the segments (as done in step 411 referred to in FIG. 4).

Finding location of the output pixel in a YUV line buffer (as done in step 412 of FIG. 4) and interpolating YUV values from the line buffer (as done in step 413 of FIG. 4) in order to calculate the YUV pixel value of the output pixel.

Next, the YUV related data from different segments are stitched (step 812) at the overlapping areas, in order to avoid discontinuities. For example, an edge-preserving re-distortion function may be used.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. For example, the apparatus may include a cameras' array that has two or more cameras, such as, for example, video cameras to capture two or more video streams of the target. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for use in a stereoscopic image generating system comprising at least two image capturing sensors, a memory means comprising a plurality of memory buffers, and at least one processor, wherein the method comprises:

identifying at least one common region of interest (ROI) at images obtained from the at least two image capturing sensors;

generating at least one Look Up table (LUT), for holding displacement values of pixels that belong to the at least one common ROI;

forwarding data associated with images obtained from the at least two image capturing sensors that relates to the at least one common ROI, to the plurality of memory buffers;

processing output lines retrieved from the plurality of memory buffers and propagating data that relates to a YUV image and associated LUTs, wherein the propagating of the data is carried out at a rate associated with a respective memory buffer from which that data is retrieved; and generating a stereoscopic image based on the propagated data.

2. The method of claim 1, wherein each of at least two of the plurality of memory buffers has a different height and/or a different width from that of another one of the at least two memory buffers.

3. The method of claim 2, wherein the data relating to the YUV image and the LUTs is propagated from one of the at least two memory buffers at a rate which is different from a rate at which said data is propagated from another of the at least two memory buffers.

4. The method of claim 1, further including a step of compressing data comprised in at least one of said plurality of memory buffers.

5. The method of claim 4, wherein data comprised in one of the at least two memory buffers is compressed at a compression which is different from a compression applied to compress data at another of the at least two memory buffers.

6. The method of claim 1, further including a step of calculating an effective memory buffer height for said plurality of memory buffers.

7. The method of claim 1, further including a step of calculating a vertical output rate for retrieving data from each of the plurality of memory buffers.

8. The method of claim 1, wherein the data forwarded to at least one of the plurality of memory buffers, is at least partially identical to data forwarded to another one of the plurality of memory buffers.

9. The method of claim 1, wherein at least one of the memory buffers from among said plurality of memory buffers comprises a plurality of buffer segments.

10. The method of claim 9, wherein data propagated from one of said plurality of buffer segments, is propagated at a rate which is different from a rate at which data is propagated from at least one other of the plurality of segments.

* * * * *